(12) United States Patent  (10) Patent No.: US 7,762,051 B2
Fackler et al.  (45) Date of Patent: Jul. 27, 2010

(54) SYSTEM FOR REMOVAL OF AGRICULTURAL HEADER

(75) Inventors: Robert L. Fackler, Ephrata, PA (US); Douglas R. Otto, Ephrata, PA (US); Charles H. Hoffman, Springville, NY (US)

(73) Assignee: CNH America LLC, New Holland, PA (US)

( * ) Notice: Subject to any disclaimer, the term of this patent is extended or adjusted under 35 U.S.C. 154(b) by 1260 days.

(21) Appl. No.: 11/301,989

(22) Filed: Dec. 13, 2005

(65) Prior Publication Data

US 2007/0012008 A1   Jan. 18, 2007

Related U.S. Application Data

(60) Provisional application No. 60/699,549, filed on Jul. 15, 2005.

(51) Int. Cl.
*A01D 34/00* (2006.01)
(52) U.S. Cl. ...................................... 56/15.6
(58) Field of Classification Search ................ 56/12.6, 56/14.9, 15.6–15.8, DIG. 9, DIG. 14
See application file for complete search history.

(56) References Cited

U.S. PATENT DOCUMENTS

| | | | |
|---|---|---|---|
| 3,270,489 A | | 9/1966 | Rohweder |
| 3,425,194 A | * | 2/1969 | Frushour et al. ............. 56/14.9 |
| 3,442,069 A | | 5/1969 | Butler et al. |
| 3,488,930 A | | 1/1970 | Gorsler et al. |
| 3,690,359 A | | 9/1972 | Wenzel et al. |
| 4,473,993 A | * | 10/1984 | Jennings et al. ............... 56/208 |
| 4,483,131 A | | 11/1984 | Schlueter |
| 4,541,229 A | | 9/1985 | Elijah |
| 4,905,462 A | | 3/1990 | Hurlburt |
| 5,633,452 A | | 5/1997 | Bebenes |
| 6,073,431 A | | 6/2000 | Osborne et al. |
| 6,581,695 B2 | | 6/2003 | Bernhardt et al. |
| 6,901,729 B1 | | 6/2005 | Otto et al. |

* cited by examiner

*Primary Examiner*—Thomas B Will
*Assistant Examiner*—Joan D Misa
(74) *Attorney, Agent, or Firm*—Patrick M. Sheldrake; John William Stader; Michael G. Harms

(57) ABSTRACT

A control system for the header flotation and lift hydraulics of an agricultural windrower that manages the effective and efficient removal of the header.

20 Claims, 5 Drawing Sheets

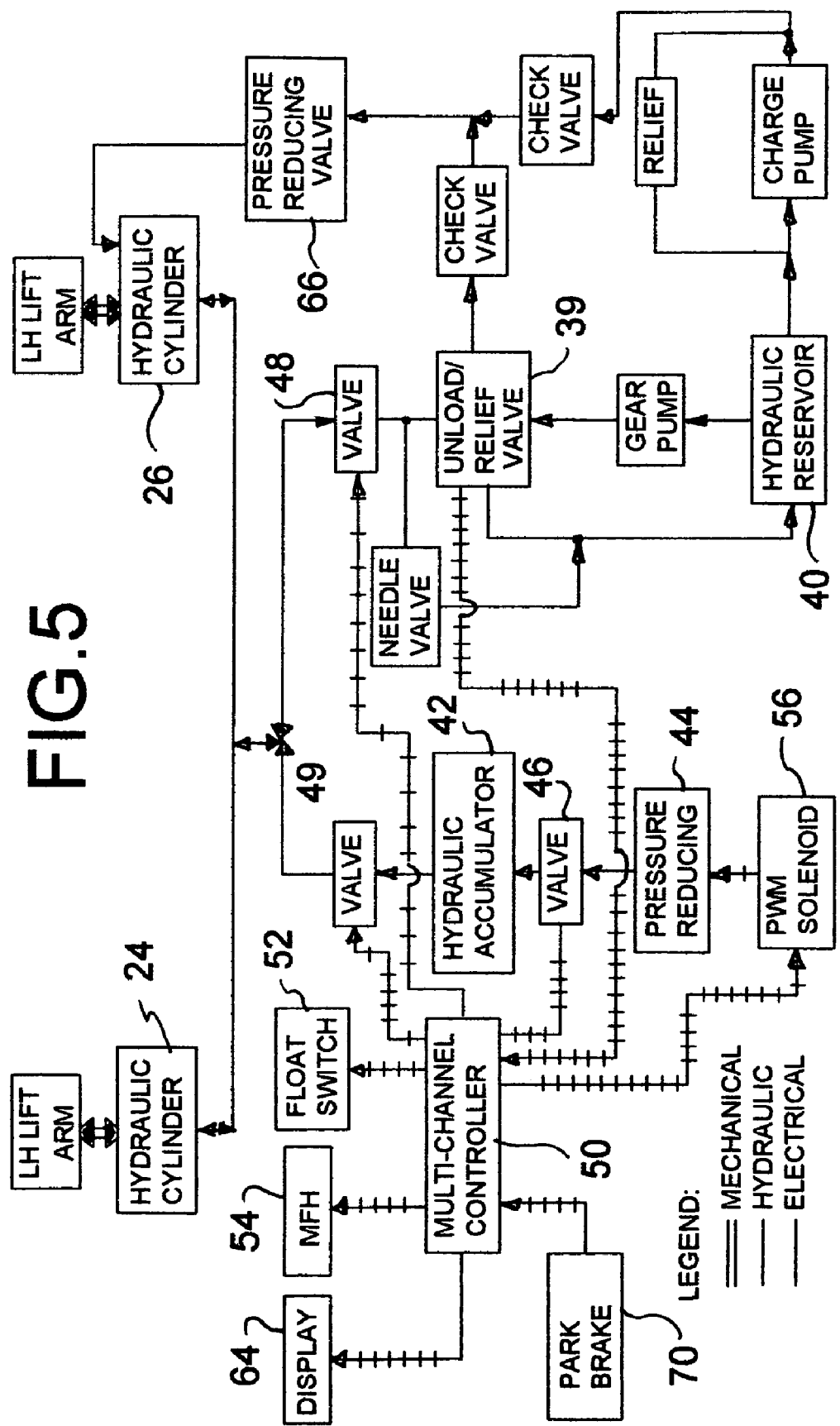

SYSTEM FOR REMOVAL OF AGRICULTURAL HEADER

CROSS-REFERENCE TO RELATED APPLICATIONS

This application claims priority to U.S. Provisional Patent Application Ser. No. 60/699,549 entitled "A Software Program to Manage the Hydraulics of a Windrower for Removal of a Header" filed on Jul. 15, 2005, in the name of the same entity as the present application.

BACKGROUND OF THE INVENTION

The present invention relates to a control for managing the removal of a header from an agricultural implement and, more particularly, to such a control for the header on a windrower header.

Regulating the positioning and operational characteristics, such as, for example, flotation, of headers on agricultural harvesters using hydraulic and electro-hydraulic control systems is generally known in the industry, as shown in U.S. Pat. No. 6,901,729. The '729 patent describes a header flotation system which is referred to as "non-independent" in that each side of the header is supported by a single hydraulic cylinder, which perform both the flotation and lift functions. A somewhat different flotation system, referred to as "independent", is shown in co-pending U.S. patent application Ser. No. 10/822,465 entitled "Independent Hydraulic Header Lift and Flotation System" and filed on Apr. 12, 2004, in the name of Kenneth W. McLean et al. In this latter system, two circuits, each with a cylinder, an accumulator, etc. are used to perform the lift and flotation functions. Both of these systems will operate in conjunction with the header removal system described herein.

It is not uncommon to use different headers for different crops or crop conditions on the same tractor unit, i.e., to change headers depending upon harvesting conditions. Furthermore, and more relevant to the instant invention, the removal of a header is not as simple as it was when agricultural machinery was less technically complicated and smaller.

Thus, it would be desirable, beneficial and advantageous to have a header removal system that is more or less automated, thus maximizing operational efficiency, operator comfort and ease of use.

SUMMARY OF THE INVENTION

Accordingly, it is an object of the present invention to provide an improved control system for the removal of a header from an agricultural tractor that overcomes or compensates for the above-noted disadvantages and problems.

It is another object of the present invention to provide a method of controlling the header flotation and lift hydraulics of an agricultural windrower to facilitate the removal of a header.

It is a further object of the present invention to provide a control system for the removal of a header from an agricultural windrower.

It is a still further object of the present invention to provide a control system for the safe and efficient removal of a header from the tractor of an agricultural windrower.

These and other objects are achieved by providing a control system for the header flotation and lift hydraulics of an agricultural windrower that manages the effective and efficient removal of the header.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a schematic of exemplary hydraulic, mechanical and electrical subsystems that cooperate to produce the system of FIGS. 1 and 4.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
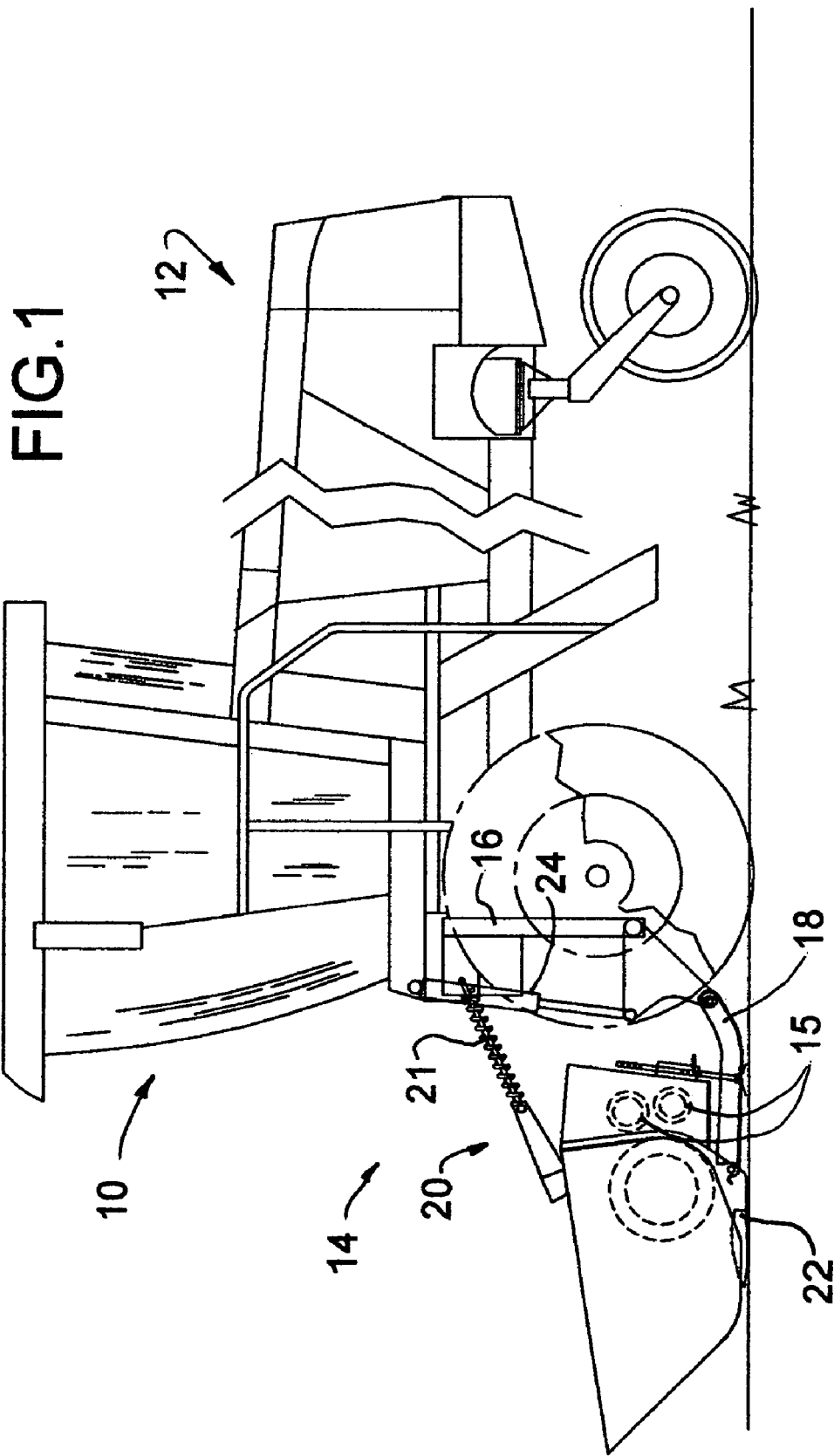
FIG. 1 is a partial side elevational view of a crop harvesting machine of the type with which the invention may be used, also showing a simplified side view of the lift and flotation system.

FIG. 1 shows a self-propelled windrower 10 of the type with which the instant invention may be advantageously utilized. More specifically, the figures illustrate the "non-independent" flotation system, discussed briefly above with reference to the '729 patent. It will, however, be appreciated that the principles of the present invention are not limited in use to this particular machine, but may be used, with slight and obvious modification, on many other harvesting machines with headers and with different flotation systems, such as the "independent" flotation system shown in the co-pending U.S. patent application, also mentioned above.

In the illustrated embodiment, the self-propelled windrower 10 comprises a tractor 12 and a header 14, the header 14 being attached to the front end of the frame 16 or chassis of the tractor 12. The header may be of generally any suitable construction or design, and may include not only crop-harvesting mechanisms, but also crop conditioners such as elongate rolls 15. Such attachment of the header 14 to the frame 16 is achieved through a pair of transversely spaced lower lift arms (only the left one, 18, being shown, the right being substantially the same) pivoted at one end to the frame 16 and at the other end to the header 14, as well as through a central upper link 20. The link 20 may advantageously take the form of a single double-acting hydraulic cylinder 21 whose extension and retraction is adjusted by the operator to remotely control the angle of the cutterbar 22 on the lower front of the header 14.

Figure 2:
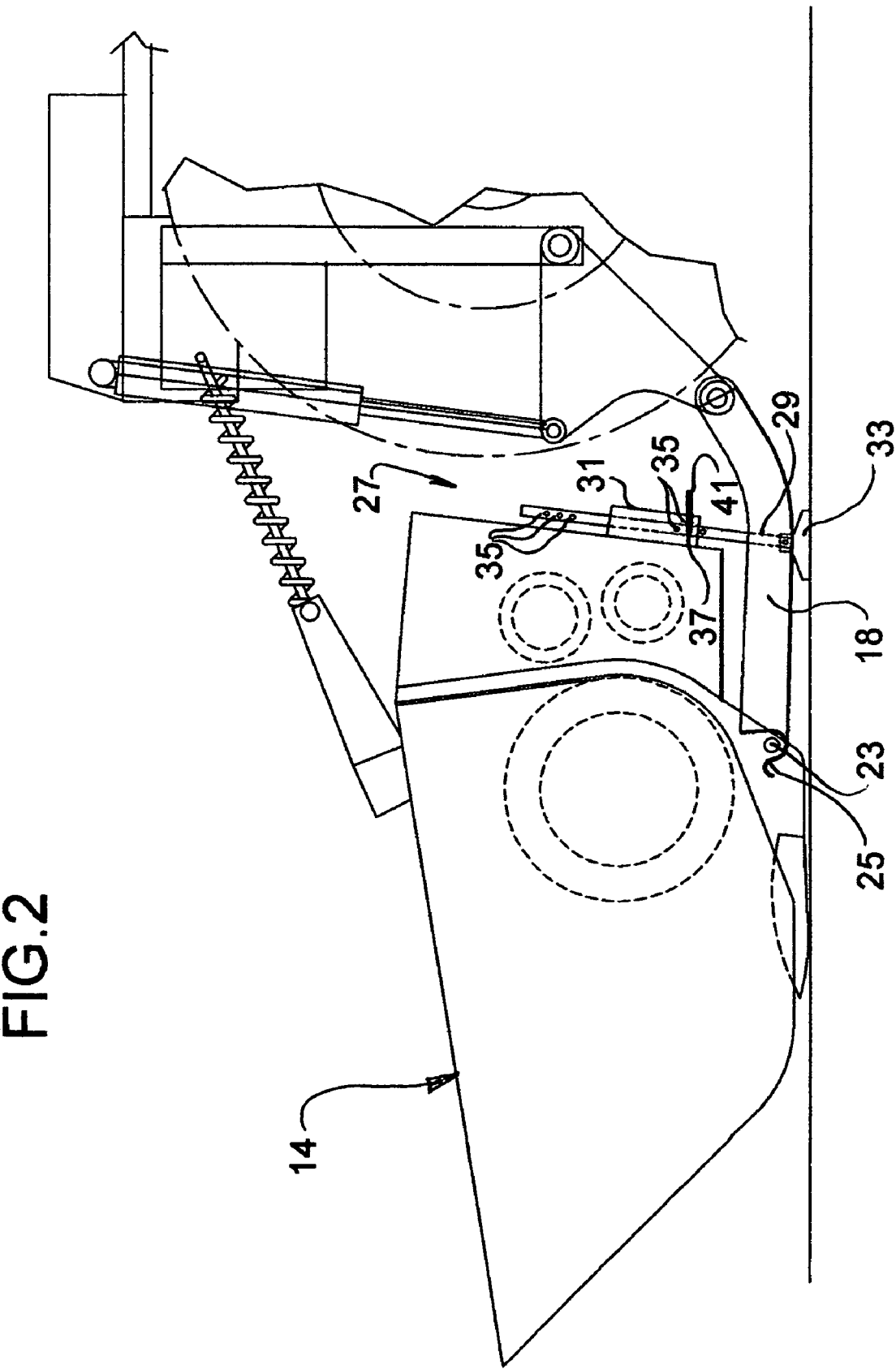
FIG. 2 is a partial left end view of the header, showing particularly the relationships between the lift pin on the header and the lift cradle on the lift arm.

Referring now to FIG. 2, it can be seen that header 14 is pivotably supported on the two lift arms. The underside of the header 14 includes two spaced-apart axially aligned lift pins (only the left one, 23, being shown, the right being substantially the same) that are engaged by lift cradles (only the left one, 25, being shown, the right being substantially the same) on the outer/forward end of lift arm 18. When the lift pins are in the cradles and the weight of header 14 is thus supported, the header may be pivoted forwardly or rearwardly (generally longitudinally of the tractor 12) about the longitudinal axes of the lift pins. Furthermore, some similar headers have a lock pin, not shown, which may be a spring clip or the like, to further hold the cradles and lift pins in engagement.

FIG. 2 also shows jack stand 27, which includes an elongated leg 29 extending through a generally open-ended box-like housing 31 affixed to the rear end of header 14. Leg 29 includes a plurality of apertures 35 spaced along the length thereof and a foot 33 fixed to its lower end for selective engagement with the ground. Leg 29 extends through housing 31, which has an aperture 37 therein. By aligning an aperture through leg 29 with the aperture through housing 31, and engaging a spring clip 41, or the like, through the aligned apertures, the position of the foot 33 may be extended to support the header in an upright position, or retracted when the header is in use. There are several similar jack stands known in the prior art, most of which would be quite suitable for the purposes of the present invention.

Figure 3:
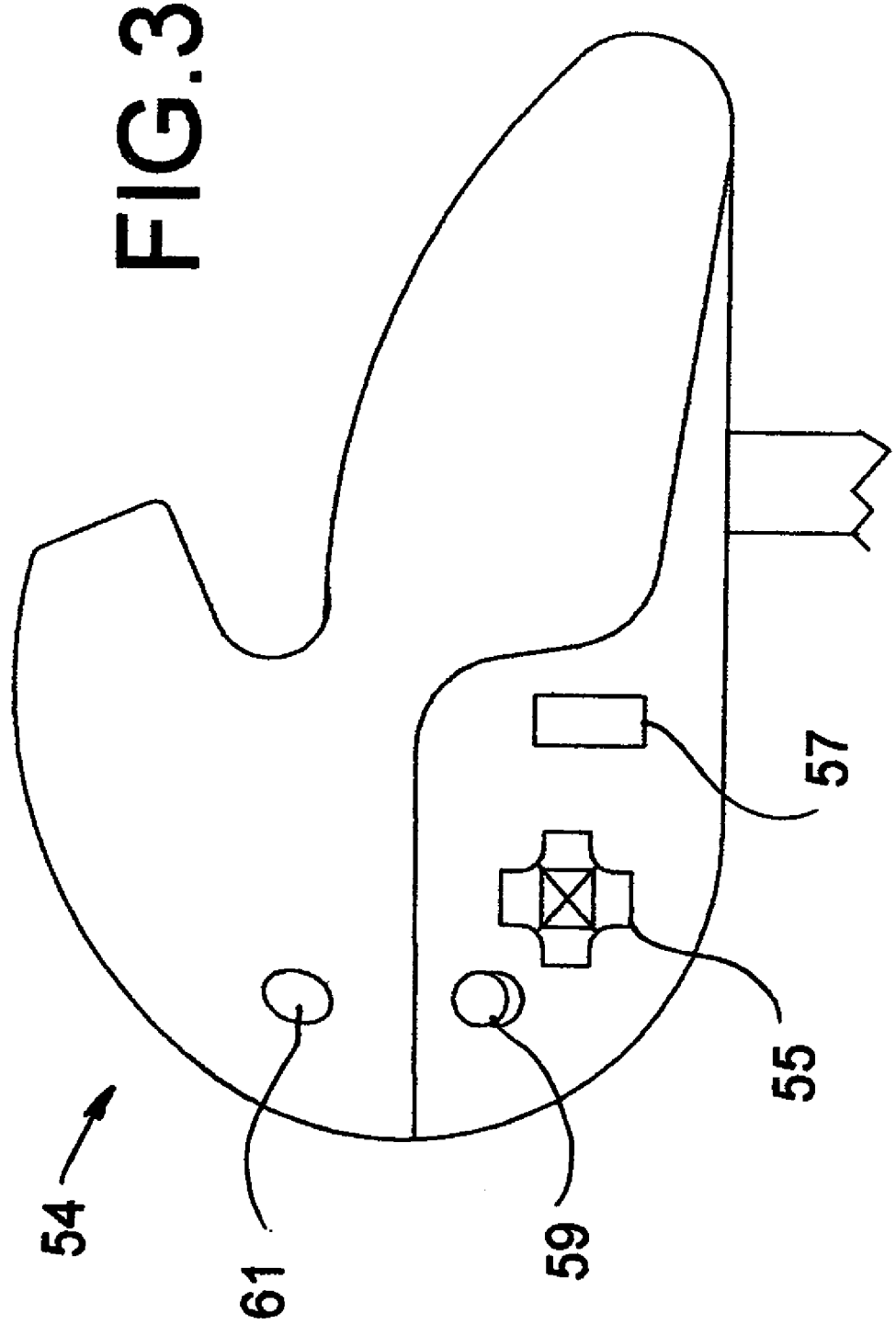
FIG. 3 is a view of one embodiment of an exemplary multifunction handle.

A single lift/flotation cylinder 24, interconnecting the lower arm 18 and the frame 16 supports each side of the header, i.e., each side of the header is supported by its own lift/flotation cylinder (again, only the left one being shown in FIG. 1). It is, at this point, useful to understand that within the operator's cab of windrower 10 there may be located a multifunction handle ("MFH"), such as shown as element 54 in FIG. 3, to function as part of the overall implement control system. MFH 54 may be located within or closely adjacent to the console, in a convenient position to the operator's right hand, and may serve as the operator's input to control and manage direction and speed of travel, header height, reel speed, raise and drop rates, various inputs to controller 50, and the like. The MFH shown is similar to that shown in more detail in U.S. Pat. No. 6,148,593, issued to Heinsey et al. on Nov. 21, 2000. The MFH of FIG. 3 would necessarily have several switching devices, such as rocker switches 55 and 57 to either move a cursor up and down a list of menu items on a display or raise and lower the header or perform or initiate other operations, plus several selection buttons, such as switches 59 and 61. The MFH could be replaced or supplemented by switches and buttons on the console; however, the MFH is a very comfortable and convenient device.

Figure 4:
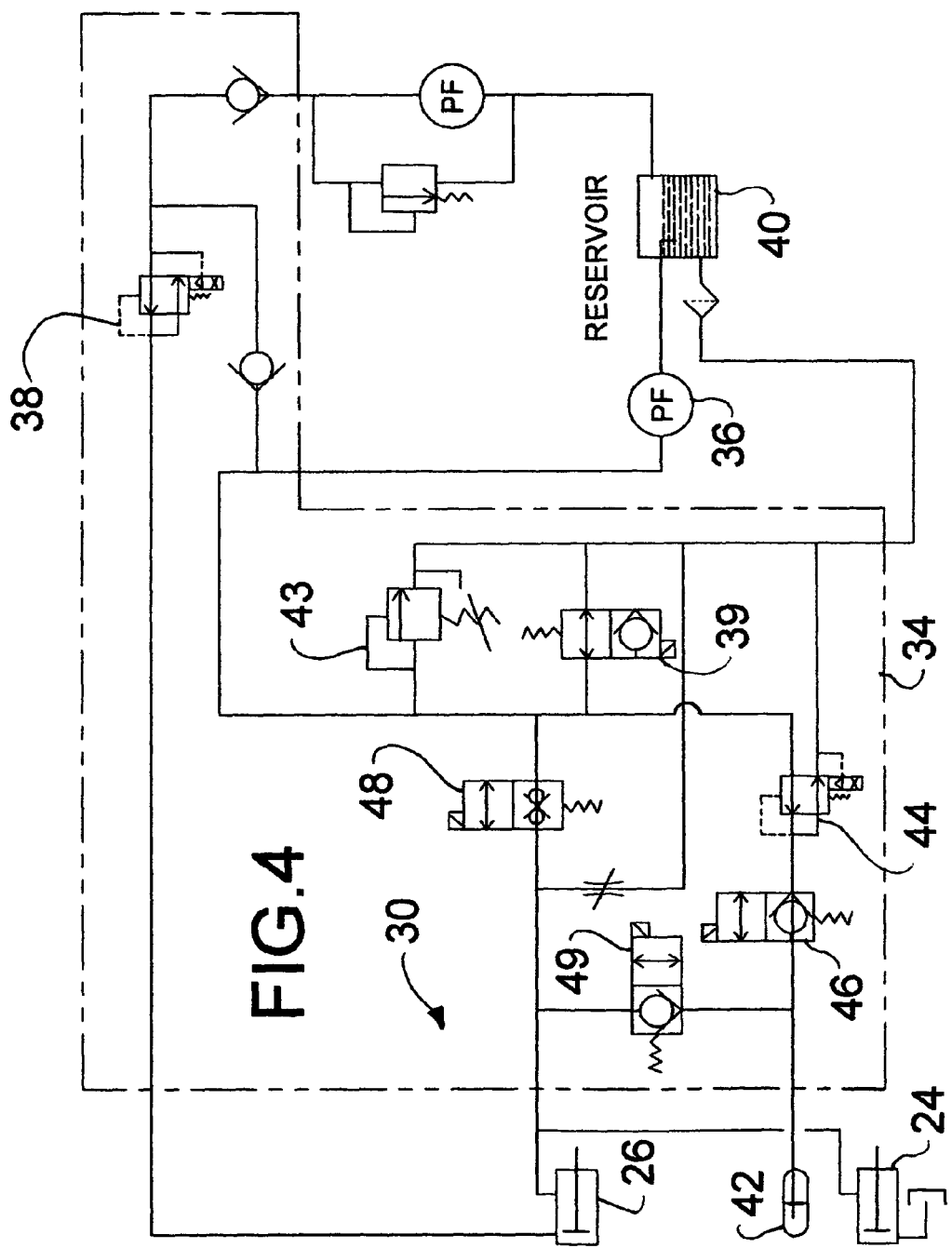
FIG. 4 is a schematic view of one embodiment of an exemplary hydraulic system.

Directing attention now to FIG. 4, the hydraulic control system for left cylinder 24 and right cylinder 26 can be seen to include an electro-hydraulic subsystem generally depicted as 30. For convenience of assembly and operation, the majority of the components may be housed in a single valve body 34 with appropriately located ports and other necessary connection devices and fixtures. A fixed displacement pump 36 moves the hydraulic fluid into subsystem 30 from reservoir 40, through the various circuits as directed by control valves, to a single accumulator 42, to hydraulic cylinders 24, 26 and back to reservoir 40 as appropriate.

While FIG. 4 should be readily understood by one of skill in the art, it is helpful to broadly identify the various components in more detail. A PRV (pressure reducing valve) 38 operates as part of the hydraulic counterweight system. Element 39 is a master solenoid valve with an associated relief valve 43. A PRV 44 for the lift/flotation and drop rate functions is in flow communication with the lower solenoid valve 46, and the float solenoid valve 49. Reference number 48 identifies the raise solenoid valve.

FIG. 5 provides a more detailed depiction of the complete control system and subsystems. The hydraulic system, as shown also in FIG. 5, additionally depicts the electrical control and mechanical subsystems. Importantly, this figure depicts the multi-channel programmable controller 50 which exchanges electrical signals from the float switch 52, the PWM (pulse width modulated) solenoid 56 associated with PRV 44, the master valve 39, and other valves to manage the lift and flotation functions as established by the operator through the appropriate switch and shown on display 64. Also depicted in FIG. 5 is MFH 54.

The hydraulic cylinders, attached to respective ends of the header 14, perform both the lift and flotation functions. The lifting and floating function is achieved by coupling the hydraulic pump(s), control manifold, and accumulator(s). The operator sets the desired flotation force by actuating a rocker switch located on the operator's console or the MFH. One switch position allows hydraulic oil to enter the accumulator (increasing the hydraulic pressure), which reduces the header contact force, or flotation force, with the ground. The other switch position allows oil to exit the accumulator (reducing the hydraulic pressure), which increases the header contact force with the ground. Once the flotation force is set, the control valves will return to this preset flotation condition whenever the float mode is selected, irrespective of subsequent header lift and lower operations.

Removal of the header, whether because field operations are completed, service is required, or to employ a different header, has not always been a particularly easy task for the operator. Referring again to the figures, the improved process for the safe, easy, and controlled removal of the header by a single operator will be described.

First, the operator will remove any pins or other locking devices that serve to keep the header engaged in the lift arm cradle, and also lower the jack stand to a position where it will support the header when it is fully lowered. Second, the operator will lower the header to the ground by engaging the "lower header" switch (a rocker switch either on the MFH or on the console). Third, the flotation setting is reduced to zero by energizing solenoid valve 56 via holding the decrease side of its rocker switch—which will show decreasing values to zero. When zero flotation is reached, controller 50 enters the "header removal mode" (HRM), lowering the header slowly and steadily by energizing the PRV circuit (solenoid valves 44, 46 and 49) and reducing the hydraulic pressure in the lift cylinder and accumulator to zero (open to tank) and keeping it there. In this manner, the header is lowered to the ground with no backpressure to prevent the lift arms from going all the way to the ground. Fifth, three seconds after entering the HRM (second time period), the controller checks to see whether the park brake 70, in FIG. 5, is engaged (via a circuit from the park brake to the controller). If brake 70 is engaged, the PRV circuit continues to maintain zero pressure for a set time period (first time period), for example, five minutes, to provide sufficient time for the operator to safely exit the cab to carry out the "seventh" step, below. The three-second interval is somewhat arbitrarily chosen, the requirement being that enough time is provided to drain the lift cylinders and the accumulator. Likewise, the five minute time period could be any reasonable amount, so long as it provides sufficient time for the job to be completed. This is an added feature that discourages the operator from unnecessarily exiting the cab during the process when the vehicle could move. Sixth, the operator extends the tilt cylinder 21 to a length that exhibits freedom from load, allowing the cylinder to be disconnected from the header—accomplished by energizing the cylinder via a rocker switch either on the console or MFH. Seventh, the operator leaves the cab and confirms that the lift arm and lift pins are separated, and disconnects the hydraulic hoses. The operator may have to use the leverage of a bar to completely separate the lift arms and lift pins. The tractor may now be backed away from the header.

The second time period limits the overall amount of time the operator has to complete the header removal process. If the second time period expires, the ECU ceases to activate the PRV circuit, thus exiting the HRM. Further, if the second time period expires and the operator wants to continue the removal process, the "lower header" side of the header raise and lower switch must be pressed twice, as explained in further detail below, to instigate an additional second time period (five minutes, for example).

If the operator then wants to drive the tractor to another location, it is likely that he will want to raise the lift arms by pressing and holding the "raise header" side of the rocker switch (mentioned above regarding the second step of the header removal process).

It should be noted that the lift arms can be raised or lowered while in the HRM by way of the aforementioned rocker switch, but if the "lower header" side of the switch is pressed the system does not immediately lower. Instead, it prompts the operator with a warning, visual or audible, to indicate that the lift arms are being regulated with zero pressure. The operator must subsequently, within five seconds (third time period), press the "lower header" switch a second time for the lower circuits to activate. This is important in the event that the lift arms were not empty, but rather were still supporting a considerable amount of weight, such as a header. The five second interval is somewhat arbitrarily chosen, the requirement being that enough time is provided to press the switch a second time and not so excessive as to allow an unsafe condition. Also, while in the HRM, an audible warning may be sounded every few seconds, 15 for example, to remind the operator of the status of the system.

If the operator has navigated the tractor to a header that he wishes to engage, and the lift arms are not in a fully lowered position, pressing the "lower header" side of the switch and satisfying the two-push requirement will activate the hydraulic lowering circuits to maintain the hydraulic pressure in the lift cylinder and accumulator at zero (open to tank). The lift arms may fall of their own accord or may need an assist, depending on the amount of friction present. If the operator must climb out of the cab to help lower the lift arms, having the park brake engaged will allow the activation to continue for a set time period, five minutes for example, to provide sufficient time for the operator to safely exit the cab and help lower the lift arms.

To exit the HRM when a header has been reattached, the operator must increase the flotation setting by incrementing the float switch until 100 psi is reached. Then, controller 50 leaves the HRM, restores the flotation settings that were employed prior to entering the HRM, and reverts back to normal header lift and flotation operation. These settings, of course, can be changed if a different header is attached or the operating conditions are to be modified. The accumulator circuit is recharged when the header lower switch is pressed for the first time after exiting HRM.

It will be understood that changes in the details, materials, steps and arrangements of parts which have been described and illustrated to explain the nature of the invention will occur to and may be made by those skilled in the art upon a reading of this disclosure within the principles and scope of the invention. For example, a touch screen visual display could be used, thus making the screen a primary input device. The foregoing description illustrates the preferred embodiment of the invention; however, concepts, as based upon the description, may be employed in other embodiments without departing from the scope of the inventions.

Having thus described the invention, what is claimed is:

1. A method of controlling the removal of a header from a self-propelled agricultural implement comprising the steps of:

providing a self-propelled agricultural implement having a wheel-supported main frame, an engine supported on the main frame, a drive train connected to the engine and providing motive power to wheels, a crop-engaging header supported on the main frame transversely to the direction of travel of the implement by a pair of transversely spaced-apart lift arms pivotably attached at one end to the main frame and removably attached to the header at an opposing end, a pair of hydraulic lift cylinders each interconnecting one of the lift arms and the main frame to selectively move the header vertically, an operator's cab supported on the main frame and having controls therein for the engine, drive train, lift cylinders, header, a park brake, and other components;

providing an ECU with a memory and programmable signal processing capabilities;

providing a hydraulic header lift and flotation system with hydraulic circuitry having a plurality of valves of various types including a master solenoid valve, a pressure reduction solenoid valve (PRV), a raise solenoid valve, a lower solenoid valve, and a float solenoid valve, all connected to the ECU for receiving variable control signals from the ECU to raise and lower the header relative to the ground and manage the header flotation characteristics, the hydraulic circuitry further including the lift cylinders, an accumulator and a reservoir;

providing a header tilt cylinder affixed at one end to the main frame and to the upper portion of the header at the opposing end;

providing a support on the ground for the rear of the header;

initiating the lower header cycle with a signal from an operator-activated switch sending a lower header signal to the ECU;

energizing an operator-activated switch sending a signal to the ECU to reduce the flotation setting to zero, at which time a controller enters the header removal mode (HRM) lowering the header slowly and steadily to the ground by energizing a PRV circuit which includes the PRV, the lower solenoid valve, and the float solenoid valve, thereby reducing the hydraulic pressure in the lift cylinders and accumulator to zero; and energizing the header tilt cylinder by energizing an operator-activated switch sending a signal to the ECU, thus energizing the tilt cylinder to tilt the header forward to the degree necessary to disconnect the tilt cylinder from the header.

2. The method of claim 1, further including the steps of:

upon entering the HRM, the ECU starts measuring a first time period and a shorter second time period;

after the second time period has expired the ECU checks to determine if the park brake is engaged;

if the park brake is engaged, and the first time period has not expired, the ECU continues to energize the PRV circuit; and if the park brake is not engaged, the ECU ceases to energize the PRV lowering circuits.

3. The method of claim 2, wherein:

the first time period is approximately five minutes.

4. The method of claim 3, wherein:

the second time period is approximately three seconds.

5. The method of claim 3, further including the step of:
upon the expiration of the second time period, the ECU de-energizes the PRV circuit if it has not otherwise already been de-energized.

6. The method of claim 4, further including the step of:
upon the expiration of the second time period, the ECU de-energizes the PRV circuit if it has not otherwise already been de-energized.

7. The method of claim 6, further including the step of:
initiating the raise header cycle by energizing an operator-activated switch, wherein energizing switch transmits a raise header signal to the ECU such that the ECU energizes raise header solenoid valve.

8. The method of claim 7, further including the steps of:
providing a signaling device within the cab;
attempting to initiate the lower header cycle by energizing the operator-activated lower header switch, thus sending a signal to the ECU; and
with the system still in the HRM, the ECU sends an energizing signal to the signaling device, informing the operator that the system is in the HRM and that the lift cylinders and accumulator are at zero pressure.

9. The method of claim 8, wherein:
the signaling device is an audible alarm.

10. The method of claim 9, further including the steps of:
sending an additional energizing signal to the signaling device at regular intervals during the HRM.

11. A method of managing the removal of a header from a self-propelled agricultural implement comprising the steps of:
providing a self-propelled agricultural implement having a wheel-supported main frame, an engine supported on the main frame, a drive train connected to the engine and providing motive power to wheels, a crop-engaging header supported on the main frame transversely to the direction of travel of the implement, the header including a pair of transversely spaced-apart lift pins on the lower portion of the header, a pair of transversely spaced-apart lift arms pivotably attached at one end to the main frame and having a lift pin cradle on the opposing end, each cradle engaged with a respective lift pin, a pair of hydraulic lift cylinders each interconnecting one of the lift arms and the main frame to selectively move the header vertically, an operator's cab supported on the main frame and having controls therein for the engine, drive train, lift cylinders, header, a park brake, and other components;
providing an ECU with a memory and programmable signal processing capabilities;
providing a hydraulic header lift and flotation system with hydraulic circuitry having a plurality of valves of various types including a master solenoid valve, a pressure reduction solenoid valve (PRV), a raise solenoid valve, a lower solenoid valve, and a float solenoid valve, all connected to the ECU for receiving variable control signals from the ECU to raise and lower the header relative to the ground and manage the header flotation characteristics, the hydraulic circuitry further including the lift cylinders, an accumulator and a reservoir;
providing a header tilt cylinder affixed at one end to the main frame and to the upper portion of the header at the opposing end;
providing a support to hold the header upright;
initiating the lower header cycle with a signal from an operator-activated switch sending a lower header signal to the ECU;
energizing an operator-activated switch sending a signal to the ECU to reduce the flotation setting to zero, at which time a controller enters the header removal mode (HRM) lowering the header slowly and steadily by energizing a PRV circuit which includes the PRV, the lower solenoid valve, and the float solenoid valve, thereby reducing the hydraulic pressure in the lift cylinders and accumulator to zero; and
energizing the header tilt cylinder by energizing an operator-activated switch sending a signal to the ECU, thus energizing the tilt cylinder to tilt the header forward to the degree necessary to disconnect the tilt cylinder from the header.

12. The method of claim 11, further including the step of:
backing the tractor away from the header; and
initiating the raise header cycle with a signal from an operator-activated switch sending a raise header signal to the ECU.

13. The method of claim 12, further including the steps of:
attempting to lower the lift arms by energizing the lower header switch and thereby sending a lower header signal to the ECU, causing the ECU to begin measuring a third time period and sending a signal to a signaling device; and
energizing the lower header switch a second time prior to the expiration of the third time period, causing the ECU to send appropriate signals to the lift cylinder solenoids to lower the header.

14. The method of claim 13, wherein:
the third time period is approximately five seconds.

15. The method of claim 14, further including the steps of:
upon entering the HRM, the ECU starts measuring a first time period and a shorter second time period;
after the second time period has expired the ECU checks to determine if the park brake is engaged;
if the park brake is engaged, and the first time period has not expired, the ECU continues to energize the PRV circuit; and
if the park brake is not engaged, the ECU ceases to energize the PRV lowering circuits.

16. The method of claim 15, wherein:
the first time period is approximately five minutes.

17. The method of claim 16, wherein:
the second time period is approximately three seconds.

18. The method of claim 17, further including the step of:
upon the expiration of the second time period, the ECU de-energizes the PRV circuit if it has not otherwise already been de-energized.

19. The method of claim 18, further including the step of:
initiating the raise header cycle by energizing an operator-activated switch, thus sending a raise header signal to the ECU, and the ECU energizing the raise header solenoid valve.

20. The method of claim 19, further including the steps of:
providing a signaling device within the cab;
attempting to initiate the lower header cycle by energizing the operator-activated lower header switch, thus sending a signal to the ECU;
with the system still in the HRM, the ECU sends an energizing signal to the signaling device, informing the operator that the system is in the HRM and that the lift cylinders and accumulator are at zero pressure; and
the signaling device is an audible alarm.

* * * * *